(12) United States Patent
Shibusawa

(10) Patent No.: US 8,860,961 B2
(45) Date of Patent: Oct. 14, 2014

(54) INFORMATION PROCESSING APPARATUS, INFORMATION PROCESSING SYSTEM AND COMPUTER READABLE MEDIUM

(75) Inventor: Toshihiko Shibusawa, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 987 days.

(21) Appl. No.: 12/722,566

(22) Filed: Mar. 12, 2010

(65) Prior Publication Data

US 2011/0096358 A1    Apr. 28, 2011

(30) Foreign Application Priority Data

Oct. 22, 2009    (JP) .................................. 2009-243079

(51) Int. Cl.
*G06F 15/00* (2006.01)
*G06F 3/12* (2006.01)

(52) U.S. Cl.
CPC ............ *G06F 3/1285* (2013.01); *G06F 3/1239* (2013.01); *G06F 3/1219* (2013.01)
USPC ......................................... 358/1.13; 358/1.15

(58) Field of Classification Search
CPC .... G06F 3/1219; G06F 3/1239; G06F 3/1285
USPC .................................. 358/1.1, 1.15
See application file for complete search history.

(56) References Cited

U.S. PATENT DOCUMENTS

| | | | | |
|---|---|---|---|---|
| 5,129,639 A | * | 7/1992 | DeHority | 270/1.01 |
| 5,287,434 A | * | 2/1994 | Bain et al. | 235/462.15 |
| 6,940,614 B2 | | 9/2005 | Subramaniam | |
| 7,619,765 B2 | | 11/2009 | Kimura et al. | |
| 2001/0006423 A1 | * | 7/2001 | Subramaniam | 358/1.1 |
| 2002/0083227 A1 | * | 6/2002 | Machida | 710/8 |
| 2005/0060649 A1 | * | 3/2005 | Kimura et al. | 715/526 |
| 2006/0158674 A1 | * | 7/2006 | Mizoguchi | 358/1.13 |

FOREIGN PATENT DOCUMENTS

| | | | |
|---|---|---|---|
| JP | 2001-236299 A | 8/2001 | |
| JP | 2003-208276 A | 7/2003 | |
| JP | 2004-213132 A | 7/2004 | |
| JP | 2005-50059 A | 2/2005 | |
| JP | 2005-258896 A | 9/2005 | |
| JP | 2008-217097 A | 9/2008 | |
| JP | 2008217097 | * 9/2008 | G06F 3/12 |

OTHER PUBLICATIONS

English machine translation of JP2008217097.*
Office Action dated Sep. 24, 2013 issued by the Japanese Patent Office in corresponding Japanese Patent Application No. 2009-243079.

* cited by examiner

*Primary Examiner* — King Poon
*Assistant Examiner* — Iriana Cruz
(74) *Attorney, Agent, or Firm* — Sughrue Mion, PLLC

(57) ABSTRACT

An information processing apparatus includes: a plurality of labels; a plurality of pieces of setting information which is associated with the respective labels, and each piece of setting information including a setting item related to processing of a device and setting content corresponding to the setting item; an identification section that, when the processing of the device is executed, acquires information for identifying one of the plurality of labels, and identifies the one of the plurality of labels from the information; and an application section that applies setting information associated with the one of the plurality of labels identified by the identification section.

14 Claims, 8 Drawing Sheets

FIG. 2

17: CUSTOMIZATION INFORMATION STORAGE FILE

```
[Default]
ColorModeDefault=B&W .........  INITIAL VALUE OF COLOR MODE IS SET TO BLACK AND WHITE
ColorMOdeRestriction=B&W  ...  COLOR MODE IS RESTRICTED TO BLACK AND WHITE
DuplexDefault=Duplex .........  INITIAL VALUE OF DUPLEX PRINTING IS SET TO LONG-SIDE STAPLING
DuplexRestriction=NotSimplex  ..  RESTRICTION IS PERFORMED TO DISABLE SIMPLEX PRINTING
NupDefault=2up ..............  2up IS SET AS INITIAL VALUE
NupRestriction=Not1up ........  RESTRICTION IS PERFORMED TO DISABLE 1up OUTPUT

[First Development Department]
ColorModeRestriction=None .....  RESTRICTION ON COLOR MODE IS LIFTED
DuplexRestriction=None ........  RESTRICTION ON DUPLEX PRINTING IS LIFTED
NupRestriction=None ...........  RESTRICTION ON Nup OUTPUT IS LIFTED

[Second Development Department]
DuplexRestriction=None ........  RESTRICTION ON DUPLEX PRINTING IS LIFTED
NupRestriction=None ...........  RESTRICTION ON Nup OUTPUT IS LIFTED
```

30 — [Default]
33 — ColorModeDefault ... NupRestriction
31 — [First Development Department]
34 — ColorModeRestriction ... NupRestriction
32 — [Second Development Department]
35 — DuplexRestriction ... NupRestriction

FIG. 6

43: CUSTOMIZATION INFORMATION STORAGE FILE

```
[Default]
ColorModeDefault=B&W         ...... INITIAL VALUE OF COLOR MODE IS SET TO BLACK AND WHITE
ColorMOdeRestriction=B&W     ..... COLOR MODE IS RESTRICTED TO BLACK AND WHITE
DuplexDefault=Duplex         ....... INITIAL VALUE OF DUPLEX PRINTING IS SET TO LONG-SIDE STAPLING
DuplexRestriction=NotSimplex .. RESTRICTION IS PERFORMED TO DISABLE SIMPLEX PRINTING
NupDefault=2up               ............. 2up IS SET AS INITIAL VALUE
NupRestriction=Not1up        .......... RESTRICTION IS PERFORMED TO DISABLE 1up OUTPUT

[First Development Department]
ColorModeRestriction=None    ..... RESTRICTION ON COLOR MODE IS LIFTED
DuplexRestriction=None       ........ RESTRICTION ON DUPLEX PRINTING IS LIFTED
NupRestriction=None          ............ RESTRICTION ON Nup OUTPUT IS LIFTED

[First Development Department Director]
NupDefault=1up               .............. 1up IS SET AS INITIAL VALUE

[Second Development Department]
DuplexRestriction=None       ......... RESTRICTION ON DUPLEX PRINTING IS LIFTED
NupRestriction=None          ............. RESTRICTION ON Nup OUTPUT IS LIFTED

[Second Development Department Director]
ColorModeRestriction=None    .... RESTRICTION ON COLOR MODE IS LIFTED
```

30 — [Default]
33 — ColorModeDefault ... NupRestriction
31 — [First Development Department]
34 — ColorModeRestriction ... NupRestriction
44 — [First Development Department Director]
46 — NupDefault=1up
32 — [Second Development Department]
35 — DuplexRestriction ... NupRestriction
45 — [Second Development Department Director]
47 — ColorModeRestriction=None

FIG. 8

48: CUSTOMIZATION INFORMATION STORAGE FILE

```
[Default]
ColorModeDefault=B&W           INITIAL VALUE OF COLOR MODE IS SET TO BLACK AND WHITE
ColorMOdeRestriction=B&W       COLOR MODE IS RESTRICTED TO BLACK AND WHITE
DuplexDefault=Duplex           INITIAL VALUE OF DUPLEX PRINTING IS SET TO LONG-SIDE STAPLING
DuplexRestriction=NotSimplex   RESTRICTION IS PERFORMED TO DISABLE SIMPLEX PRINTING
NupDefault=2up                 2up IS SET AS INITIAL VALUE
NupRestriction=Not1up          RESTRICTION IS PERFORMED TO DISABLE 1up OUTPUT

[First Development Department]
ColorModeRestriction=None      RESTRICTION ON COLOR MODE IS LIFTED
DuplexRestriction=None         RESTRICTION ON DUPLEX PRINTING IS LIFTED
NupRestriction=None            RESTRICTION ON Nup OUTPUT IS LIFTED

[Second Development Department]
DuplexRestriction=None         RESTRICTION ON DUPLEX PRINTING IS LIFTED
NupDefault=1up                 1up IS SET AS INITIAL VALUE

[Third Development Department]
[First Development Department]
[Second Development Department]
```

30 → [Default]
33 → ColorModeDefault ... NupRestriction
31 → [First Development Department]
34 → ColorModeRestriction ... NupRestriction
32 → [Second Development Department]
35 → DuplexRestriction, NupDefault
49 → [Third Development Department]
50 → { 31 [First Development Department], 32 [Second Development Department] }

INFORMATION PROCESSING APPARATUS, INFORMATION PROCESSING SYSTEM AND COMPUTER READABLE MEDIUM

CROSS-REFERENCE TO RELATED APPLICATIONS

This application is based on and claims priority under 35 USC 119 from Japanese Patent Application No. 2009-243079 filed on Oct. 22, 2009.

BACKGROUND

1. Technical Field

The present invention relates to an information processing apparatus, an information processing system and a computer readable medium.

2. Related Art

In recent years, there has been an increase in the number of cases where a printer driver capable of customization by a user is provided because a general user would like to use a function frequently used by the user to be set as an initial value and, a administrator would like to restrict a function which the administrator is not willing to allow the general user to use.

As a method for the customization, there is devised a method in which customization information described in an external file of a printer driver is read through a setting screen of the printer driver or read by an installer of the printer driver, and is applied to the printer driver.

SUMMARY

According to an aspect of the invention, An information processing apparatus includes: a plurality of labels; a plurality of pieces of setting information which is associated with the respective labels, and each piece of setting information including a setting item related to processing of a device and setting content corresponding to the setting item; an identification section that, when the processing of the device is executed, acquires information for identifying one of the plurality of labels, and identifies the one of the plurality of labels from the information; and an application section that applies setting information associated with the one of the plurality of labels identified by the identification section.

BRIEF DESCRIPTION OF THE DRAWINGS

Exemplary embodiment(s) of the present invention will be described in detail based on the following figures, wherein:

FIG. 2 is a view showing a customization information storage file according to the first exemplary embodiment;

FIG. 6 is a view showing a customization information storage file according to the third exemplary embodiment;

FIG. 8 is a view showing a customization information storage file according to a fourth exemplary embodiment.

DETAILED DESCRIPTION

A description will be given hereinbelow of exemplary embodiments for carrying out the invention with reference to the drawings.

1. First Exemplary Embodiment

Structure of Information Processing System

Figure 1:
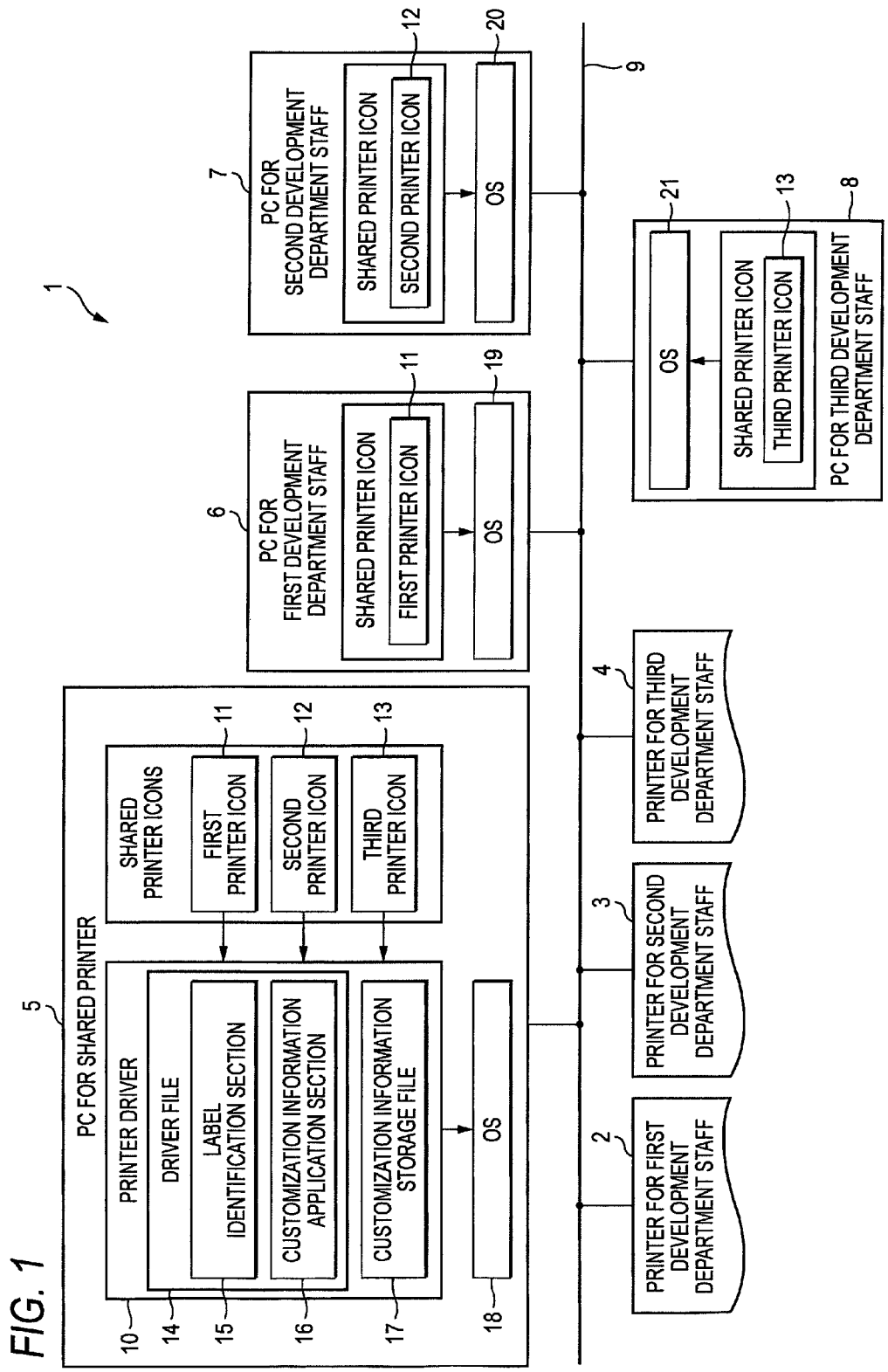
FIG. 1 is a block diagram showing a structure of an information processing system according to a first exemplary embodiment.

In a first exemplary embodiment, a system of a shared printer is adopted. The shared printer denotes a system in which one printer driver is shared by a plurality of information processing apparatuses. FIG. 1 is a block diagram showing a structure of an information processing system according to the first exemplary embodiment. An information processing system 1 of FIG. 1 includes a printer for first development department staff 2, a printer for second development department staff 3, a printer for third development department staff 4, a PC for shared printer 5, a PC for first development department staff 6, a PC for second development department staff 7, and a PC for third development department staff 8. They are wiredly or wirelessly connected to a LAN 9 (Local Area Network).

The printer for first development department staff 2, the printer for second development department staff 3, and the printer for third development department staff 4 are printers of the same model. Print jobs of the printers 2 to 4 are generated by an identical printer driver 10. In addition, different customizations are selectively applied to the printers 2 to 4 by the single printer driver 10.

The PC for shared printer 5, the PC for first development department staff 6, the PC for second development department staff 7, and the PC for third development department staff 8 are personal computers, and each of the personal computers includes hardware such as a CPU (Central Processing Unit), a ROM (Read Only Memory), a RAM (Random Access Memory), a HDD (Hard Disk Drive), an input/output control part, a mouse, a keyboard, and a liquid crystal display (the depiction thereof is omitted).

The PC for shared printer 5 includes the printer driver 10, a first printer icon 11, a second printer icon 12, a third printer icon 13, and an OS (Operating System) 18.

The first printer icon 11 is a shared printer icon with which the print job of the printer driver 10 is associated so as to be outputted to the printer for first development department staff 2. The second printer icon 12 is the share printer icon with which the print job of the printer driver 10 is associated so as to be outputted to the printer for second development department staff 3. The third printer icon 13 is the shared printer icon with which the print job of the printer driver 10 is associated so as to be outputted to the printer for third development department staff 4.

The names of the first printer icon 11 to the third printer icon 13 are composed of information for identifying the printers 2 to 4. That is, the name of the first printer icon 11 is the "printer for first development department staff", the name of the second printer icon 12 is the "printer for second development department staff", and the name of the third printer icon 13 is the "printer for third development department staff".

The printer driver 10 is a device driver for the printers 2 to 4, and includes a driver file 14 and a customization information storage file 17. The driver file 14 is a program file for generating the print job, while the customization information storage file 17 is a setting file in which pieces of customization information related to the processings of the printers 2 to 4 is described. The customization information storage file 17 is used as one of configuration files of the printer driver 10.

As will be described later, in the customization information storage file 17, plural labels (plural pieces of label information) and pieces of customization information associated with the respective labels are described. A label identification section 15 of the driver file 14 acquires information for identifying the labels (the names of the shared printer icons), and identifies the labels from the information when the processings of the printers 2 to 4 are executed. A customization information application section 16 of the driver file 14 applies the piece of customization information associated with the label identified by the label identification section 15. Specifically, the piece of customization information is displayed on the setting screen of the printer driver 10, and the piece of customization information is stored in the print job.

The OS 18 is basic software operating on the hardware of the PC 5. The OS 18 has a setting section for setting the authority to produce or edit the customization informations storage file 17 for a log-in user or a log-in group to the PC 5. A administrator who is given the authority to produce or edit the customization information storage file 17 can restrict the processings of the printers 2 to 4 for a general user who is not given the authority.

In addition, the OS 18 also has a setting section for setting the authority to produce or edit the information for identifying the labels (the first printer icon 11 to the third printer icon 13) for the log-in user or the log-in group to the PC 5. The administrator who is given the authority to produce or edit the first printer icon 11 to the third printer icon 13 can restrict the available printer for the general user who is not given the authority.

Further, the OS 18 also has a setting section for setting the authority to access information for identifying devices (the first printer icon 11 to the third printer icon 13) for the client PCs 6 to 8. The client PCs 6 to 8 which are given the authority to access the first printer icon 11 to the third printer icon 13 can use the printers 2 to 4. The available printers 2 to 4 are restricted for the client PCs 6 to 8 which are not given the authority to access the first printer icon 11 to the third printer icon 13. In the case of FIG. 1, the PC for first development department staff 6 can access only the first printer icon 11, the PC for second development department staff 7 can access only the second printer icon 12, and the PC for third development department staff 8 can access only the third printer icon 13.

The PC for first development department staff 6 includes the first printer icon 11 and an OS 19. The PC for first development department staff 6 accesses the PC for shared printer 5, and then accesses the accessible first printer icon 11 to generate the first printer icon 11. When the PC for first development department staff 6 starts printing by using the first printer icon 11, the OS 19 makes a request to the PC for shared printer 5 for the reception of the printer driver 10.

The PC for second development department staff 7 includes the second printer icon 12 and an OS 20. The PC for second development department staff 7 accesses the PC for shared printer 5, and then accesses the accessible second printer icon 12 to generate the second printer icon 12. When the PC for second development department staff 7 starts the printing by using the second printer icon 12, the OS 20 makes a request to the PC for shared printer 5 for the reception of the printer driver 10.

The PC for third development department staff 8 includes the third printer icon 13 and an OS 21. The PC for third development department staff 8 accesses the PC for shared printer 5, and then accesses the accessible third printer icon 13 to generate the third printer icon 13. When the PC for third development department staff 8 starts the printing by using the third printer icon 13, the OS 21 makes a request to the PC for shared printer 5 for the reception of the printer driver 10.

The OS 18 of the PC for shared printer 5 transmits the printer driver 10 to the client PCs 6 to 8. The client PCs 6 to 8 start the printing by using the printer driver 10 received from the PC for shared printer 5. The printer driver 10 applies customization processings on the basis of the names of the first printer icon 11 to the third printer icon 13 to generate the print jobs. The print jobs generated in the client PCs 6 to 8 are transmitted to the printers 2 to 4 via the PC for shared printer 5.

It is to be noted that, in the printing for the second or subsequent time, the client PCs 6 to 8 make an inquiry about the presence or absence of the updated printer driver 10 to the PC for shared printer 5. When the updated printer driver 10 is absent, the print job is generated by using the already received printer driver 10, while when the updated printer driver 10 is present, the client PCs 6 to 8 receive the new printer driver 10 from the PC for shared printer 5.

Next, a description will be given of the customization processing of the printer driver 10. FIG. 2 is a view showing the customization information storage file according to the first exemplary embodiment. The customization information storage file 17 has a plurality of labels 30 to 32, and pieces of customization information 33 to 35 which are associated with each of the labels, and indicate setting items and their setting contents related to the processings of the printers 2 to 4.

The label 30 is a "Default" label indicative of an initial setting, and a common setting (the customization information 33) is applied to the plurality of printers 2 to 4 of the same model. In the case of FIG. 2, each of the printers 2 to 4 is restricted to black and white printing, duplex printing, and an output at not less than 2 up.

The label 31 is a "first development department" label, and is composed of at least part of the information for identifying the printer 2. The information for identifying the printer 2 may be any information which can identify the printer 2 such as a production number, a machine number, an IP (Internet Protocol) address, an MAC (Media Access Control) address, a place of installation, and a department of installation in addition to the name of the printer 2.

The information for identifying the label 31 is acquired from the name of the first printer icon 11. When the label composed of at least part of the name of the first printer icon 11 is present, the customization information 34 of the label 31 is applied. At this time, the customization information 33 of the "Default" label 30 is overwritten with the customization information 34 of the "first development department" label 31. In the case of FIG. 2, the printer for first development department staff 2 can perform color printing, simplex printing, and the output at 1 up.

The label 32 is a "second development department" label, and is composed of at least part of the information for identifying the printer 3. The information for identifying the printer 3 may be any information which can identify the printer 3 such as the production number, the machine number, the IP address, the MAC address, the place of installation, and the department of installation in addition to the name of the printer 3.

The information for identifying the label 32 is acquired from the name of the second printer icon 12. When the label 32 composed of at least part of the name of the second printer icon 12 is present, the customization information 35 of the label 32 is applied. At this time, the customization information 33 of the "Default" label 30 is overwritten with the customization information 35 of the "second development department" label 32. In the case of FIG. 2, the printer for second development department staff 3 can perform the simplex printing and the output at 1 up, but can not perform the color printing.

In addition, in the case of FIG. 2, since a "third development department" label is not described, only the customization information 33 of the "Default" label 30 is applied to the printer for third development department staff 4. In this case, the printer for third development department staff 4 is restricted to the black and white printing, the duplex printing, and the output at not less than 2 up.

(Operation of Printer Driver)

Figure 3:
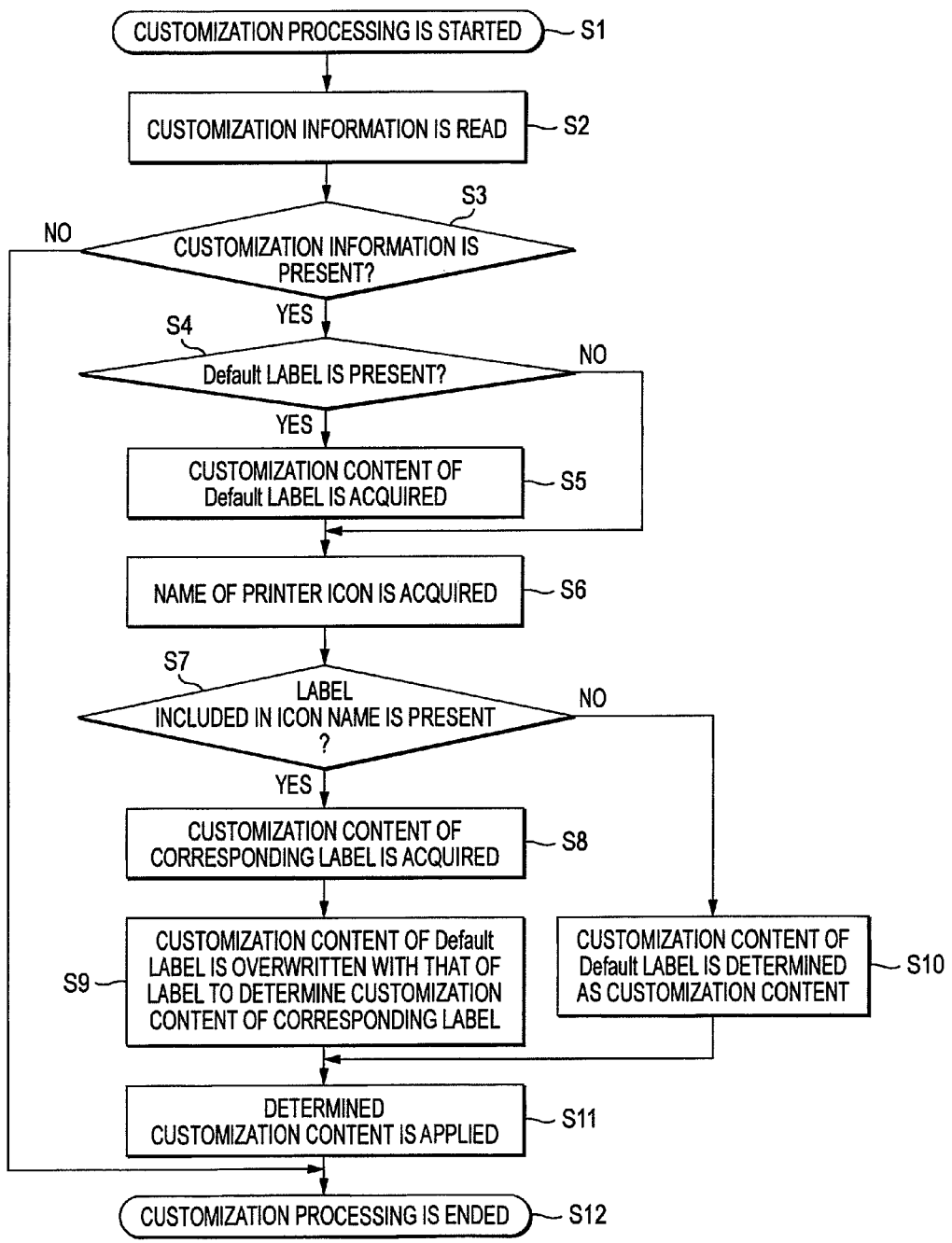
FIG. 3 is a flow chart showing an operation of a printer driver according to the first exemplary embodiment.

A description will be given hereinbelow of an operation of the printer driver 10. FIG. 3 is a flow chart showing the operation of the printer driver according to the first exemplary embodiment. It is possible to provide the printer driver (program) which executes the flow chart by storing the printer driver in a computer readable medium such as a CDROM or the like.

When the printer driver 10 starts the customization processing (step S1), the printer driver 10 firstly reads the customization information storage file 17 (step S2). The printer driver 10 judges whether or not the customization information storage file 17 is present (step S3). When the customization information storage file 17 is not present (NO in step S3), the printer driver 10 ends the customization processing (step S12). At this time, the printer driver 10 applies a standard setting.

On the other hand, when the customization information storage file 17 is present (YES in step S3), the printer driver 10 judges whether or not the "Default" label 30 is present (step S4). When the "Default" label 30 is present (YES in step S4), the printer driver 10 acquires the customization information 33 of the "Default" label 30 (step S5). When the "Default" label 30 is not present (NO in step S4), the operational flow advances to step S6.

Next, the printer driver 10 acquires the names of the shared printer icons (step S6), and judges whether or not the label included in the names of the shared printer icons is present (step S7). In other words, the printer driver 10 judges whether or not the label composed of at least part of the names of the shared printer icons is present.

When the label included in the names of the shared printer icons is present (YES in step S7), the printer driver 10 acquires the customization content of the corresponding label (step S8), and overwrites the customization information 33 of the "Default" label 30 with the customization content of the corresponding label to determine the customization content (step S9).

On the other hand, when the label included in the names of the shared printer icons is not present (NO in step S7), the printer driver 10 determines the customization information 33 of the "Default" label 30 as the customization content (step S10).

The printer driver 10 applies the determined customization content (step S11), reflects the determined customization content on the setting screen of the printer driver 10, and stores the customization information in the print job. Then, the printer driver 10 ends the customization processing (step S12).

Advantage of First Exemplary Embodiment

According to the first exemplary embodiment, it is possible to solve the problem that the customization information is prepared as the external file of the printer driver. Specifically, in the system of the shared printer, the printer driver 10 stored in the PC for shared printer 5 is automatically downloaded to the client PCs 6 to 8, and the client PCs 6 to 8 perform the printing by using the printer driver 10.

At this time, since the customization information storage file 17 is one of configuration files of the printer driver 10, the customization information storage file 17 is a target to be downloaded so that the customization is automatically performed as intended. Accordingly, it becomes unnecessary for the general user or the administrator to perform extra procedure such as reading the setting file onto the setting screen of the printer driver or reading the setting file into the installer of the printer driver.

In addition, the customization information storage file 17 has the plurality of labels 31 and 32, and the pieces of customization information 34 and 35 which are respectively associated with the labels 31 and 32. The labels 31 and 32 are composed of at least part of the information for identifying the printers 2 and 3 (the names of the printers 2 and 3) and, when the processings of the printers 2 and 3 are executed, the information for identifying the labels 31 and 32 (the names of the first printer icon 11 to the third printer icon 13) is acquired, the labels 31 and 32 are identified from the information, and the pieces of customization information 34 and 35 associated with the identified labels 31 and 32 are applied. Consequently, it is possible to selectively apply different customizations to the plurality of printers 2 to 4 of the same model using the single printer driver 10.

Further, since the customization information storage file 17 has the "Default" label 30 indicative of the initial setting, it is possible to apply the common setting to the plurality of printers 2 to 4 of the same model. Furthermore, since the customization information 33 of the "Default" label 30 is overwritten with the pieces of the customization information 34 and 35 of other labels 31 and 32, it is possible to apply the settings different from the common setting to the plurality of printers 2 to 4 of the same model.

Moreover, since the OS 18 has the setting section for setting the authority to produce or edit the customization information storage file 17, the administrator who is given the authority to produce or edit the customization information storage file 17 can restrict the processings of the printers 2 to 4 for the general user who is not given the authority.

Additionally, since the OS 18 has the setting section for setting the authority to produce or edit the information for identifying the labels (the first printer icon 11 to the third printer icon 13), the administrator who is given the authority to produce or edit the first printer icon 11 to the third printer icon 13 can restrict the available printers 2 to 4 for the general user who is not given the authority.

In addition, since the OS 18 has the setting section for setting the authority to access the information for identifying the devices (the first printer icon 11 to the third printer icon 13), the available printers 2 to 4 are restricted for the client PCs 6 to 8 which are not given the authority to access the first printer icon 11 to the third printer icon 13.

2. Second Exemplary Embodiment

A description will be given hereinbelow of a variation of the first exemplary embodiment. The description of the same components as those of the first exemplary embodiment will be omitted.

(Structure of Information Processing System)

Figure 4:
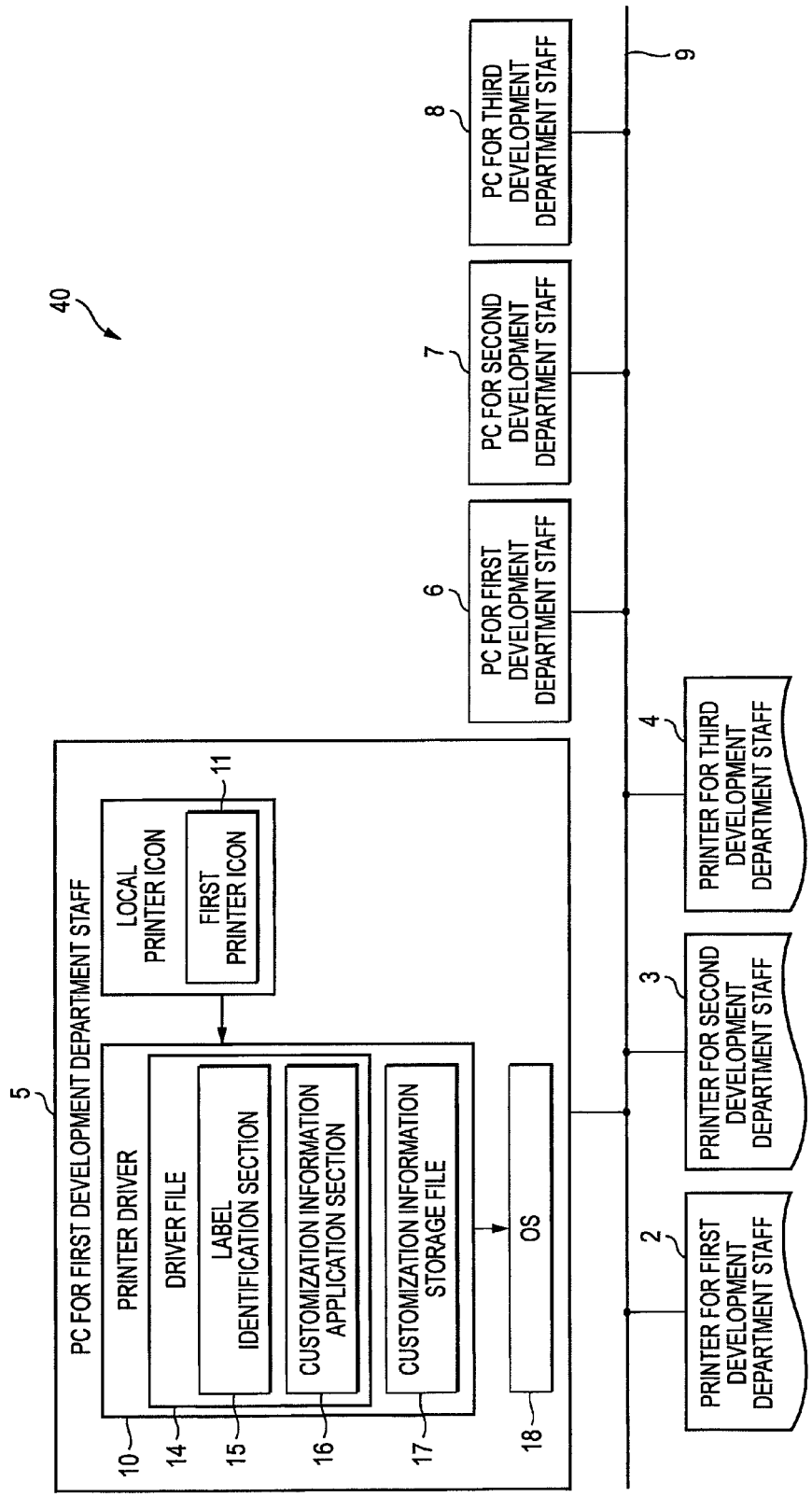
FIG. 4 is a block diagram showing a structure of an information processing system according to a second exemplary embodiment.

In a second exemplary embodiment, the system of a local printer is adopted. The local printer denotes a system in which the printer driver is installed in each computer. FIG. 4 is a block diagram showing a structure of an information processing system according to the second exemplary embodiment. An information processing system 40 includes a PC for first development department staff 5, the PC for first development department staff 6, the PC for second development department staff 7, and the PC for third development department staff 8. In each of the PCs 5 to 8, the same printer driver 10 is installed, and local printer icons in correspondence to the departments to which they belong are produced.

The PC 5 includes the first printer icon 11. The first printer icon 11 is a local printer icon with which the print job of the printer driver 10 is associated so as to be outputted to the printer for first development department staff 2. The name of the first printer icon 11 is the "printer for first development department staff".

The OS 18 has the setting section for setting the authority to produce or edit the customization information storage file 17 for the log-in user or the log-in group to the PC 5. The administrator who is given the authority to produce or edit the customization information storage file 17 can restrict the processing of the printer 2 for the general user who is not given the authority.

Additionally, the OS 18 also has the setting section for setting the authority to produce or edit the information for identifying the label (first printer icon 11) for the log-in user or the log-in group to the PC 5. The administrator who is given the authority to produce or edit the first printer icon 11 can restrict the available printer for the general user who is not given the authority.

When the PC 5 starts the printing by using the first printer icon 11, the printer driver 10 applies the customization processing on the basis of the name of the first printer icon 11 to generate the print job. The print job generated in the PC 5 is directly transmitted to the printer 2.

Advantage of Second Exemplary Embodiment

According to the second exemplary embodiment, even in the system of the local printer, since the OS 18 has the setting section for setting the authority to produce or edit the customization information storage file 17 and the first printer icon 11, the administrator who is given the authority can restrict the processing of the printer 2 and the available printer for the general user who is not given the authority.

On the other hand, in the system of the shared printer described in the first exemplary embodiment, even when the authority to produce or edit the customization information storage file 17 and the first printer icon 11 is not set for the OSs 19 to 21 of the client PCs 6 to 8, since the OS 18 of the PC for shared printer 5 has the setting section for setting the authority to access the first printer icon 11 to the third printer icon 13, it is possible to restrict the processing of the printer 2 and the available printer.

3. Third Exemplary Embodiment

A description will be given hereinbelow of a variation of the first exemplary embodiment. The description of the same components as those of the first exemplary embodiment will be omitted.

(Structure of Information Processing System)

Figure 5:
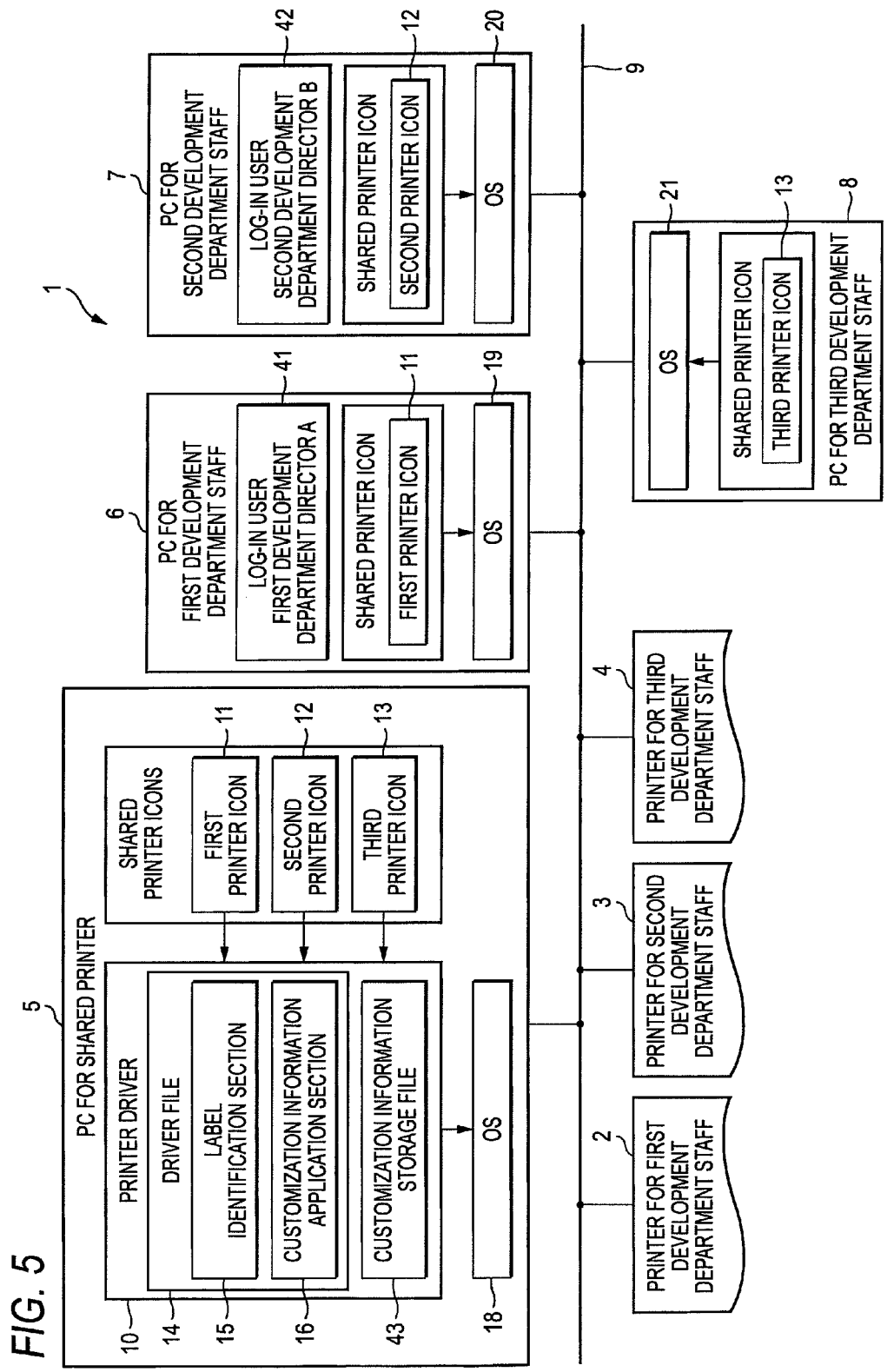
FIG. 5 is a block diagram showing a structure of an information processing system according to a third exemplary embodiment.

In a third exemplary embodiment, the customization processing is performed further in accordance with the name of the log-in user. FIG. 5 is a block diagram showing a structure of an information processing system according to the third exemplary embodiment. The OS 19 of the PC for first development department staff 6 and the OS 20 of the PC for second development department staff 7 manage log-in users 41 and 42. The name of the log-in user 41 to the PC 6 is a "first development department director", while the name of the log-in user 42 to the PC 7 is a "second development department director".

FIG. 6 is a view showing a customization information storage file according to the third exemplary embodiment. A customization information storage file 43 shown in FIG. 6 has labels 44 and 45, and pieces of customization information 46 and 47 in addition to those in the case of the first exemplary embodiment.

The label 44 is a "first development department director" label, and is composed of at least part of information for identifying the user. The information for identifying the user may be any information which can identify the user such as the name of the log-in group, a mail address, a telephone number, an address, and a date of birth in addition to the name of the log-in user 41.

The information for identifying the label 44 is acquired from the name of the log-in user 41. When the label 44 composed of at least part of the name of the log-in user 41 is present, the customization information 46 of the label 44 is applied. In the case of FIG. 6, in the printer for first development department staff 2 used by the first development department director, the output at 1 up is set as the initial value. In this case, the customization content is applied in which the customization information 33 of the "Default" label 30 is overwritten with the customization information 33 of the "first development department" label 31, and is further overwritten with the customization information 46 of the "first development department director" label 44. That is, the printer for first development department staff 2 used by the first development department director can perform the color printing, the simplex printing, and the output at 1 up, and the output at 1 up is set as the initial value in the printer for first development department staff 2.

The label 45 is a "second development department director" label, and is composed of at least part of the information for identifying the user. The information for identifying the user may be any information which can identify the user such as the name of the log-in group, the mail address, the telephone number, the address, and the date of birth in addition to the name of the log-in user 42.

The information for identifying the label 45 is acquired from the name of the log-in user 42. When the label 45 composed of at least part of the name of the log-in user 42 is present, the customization information 47 of the label 45 is applied. In the case of FIG. 6, the printer for second development department staff 3 used by the second development department director can perform the color printing. In this case, the customization content is applied in which the customization information 33 of the "Default" label 30 is overwritten with the customization information 35 of the "second development department" label 32, and is further overwritten with the customization information 47 of the "second development department director" label 45. That is, the printer for second development department staff 3 used by the second development department director can perform the color printing, the simplex printing, and the output at 1 up.

In addition, in the case of FIG. 6, since the label composed of at least part of the information for identifying the user is not described other than the labels mentioned above, the first or second development department staff who is not at the position of the director is subject to the restrictions by the pieces of customization information 34 and 35 of the "first development department" label 31 and the "second development department" label 32.

Further, in the case of FIG. 6, since the "third development department" label or the label composed of at least part of the name of the third development department staff is not described, to the printer for third development department staff 4 used by the PC for third development department staff 8, only the customization information 33 of the "Default" label 30 is applied.

It is to be noted that, since the customization information 33 is overwritten with other pieces of customization information in the order that they are described in the customization information storage file 43, the labels may be described in decreasing order of the applicable range. For example, the label composed of at least part of the information for identifying the printer, the label composed of at least part of the information for identifying the information processing apparatus, and the label composed of at least part of the information for identifying the user may be described in this order.

Additionally, the label may be composed of at least part of the information for identifying the information processing apparatus. The information for identifying the information processing apparatus may be any information which can identify the information processing apparatus such as the names of the PCs 6 to 8, the production number, the machine number, the IP address, and the MAC address.

As shown in the exemplary embodiments mentioned above, an arbitrary character string can be described in the label. Accordingly, the information for identifying the printers 2 to 4, the information for identifying the user, and the information identifying the information processing apparatus can be arbitrarily determined.

(Operation of Printer Driver)

Figure 7:
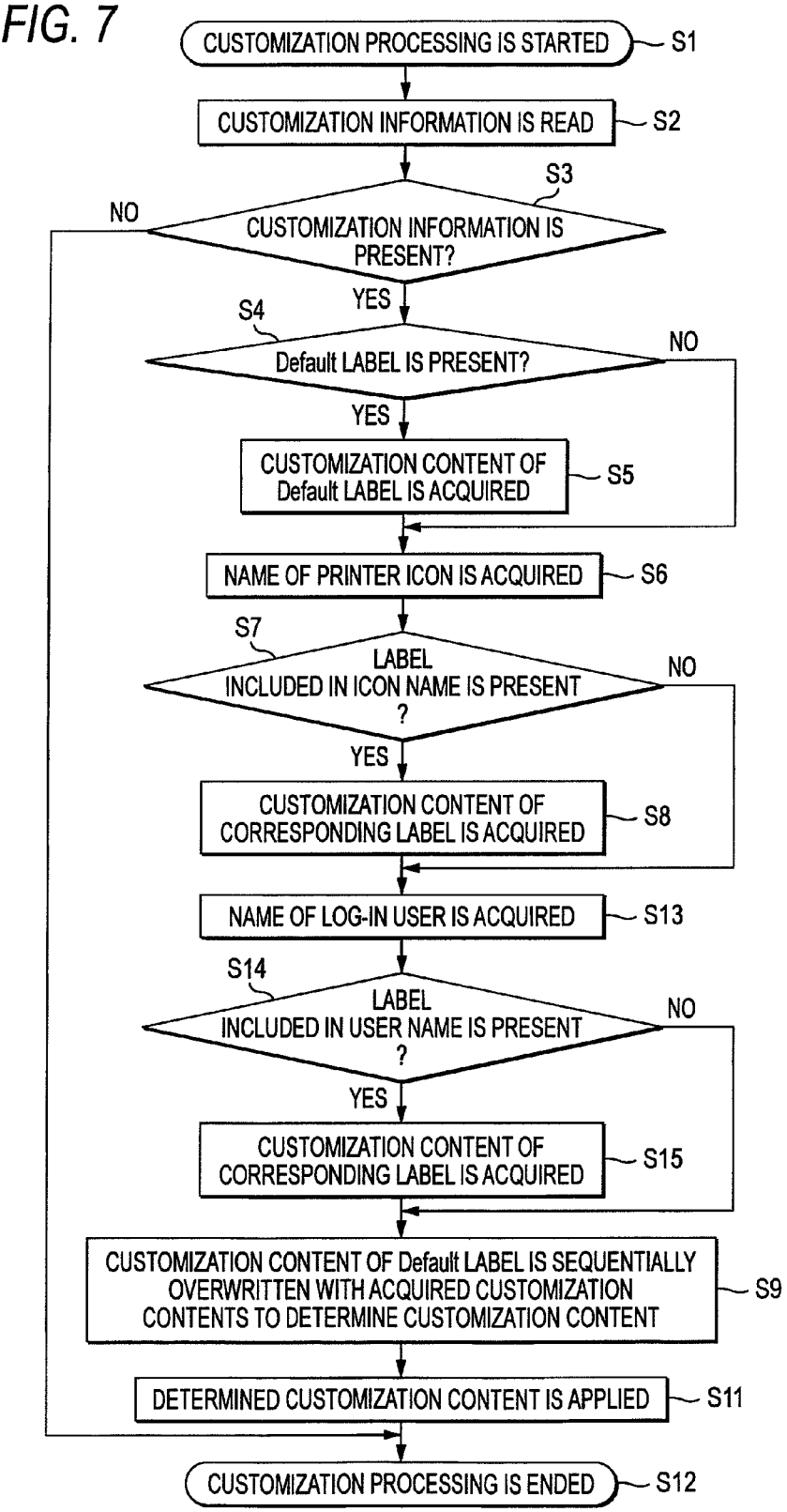
FIG. 7 is a flow chart showing an operation of a printer driver according to the third exemplary embodiment.

A description will be given hereinbelow of an operation of the printer driver 10. FIG. 7 is a flow chart showing the operation of the printer driver according to the third exemplary embodiment. It is possible to provide the printer driver (program) which executes the flow chart by storing the printer driver in the computer readable medium such as the CDROM or the like.

The processing up to step S8 is the same as the processing up to step S8 of FIG. 3. After step S8, the name of the log-in user is acquired (step S13), and it is judged whether or not the label included in the name of the log-in user is present (step S14). Specifically, it is judged whether or not the label composed of at least part of the name of the log-in user is present.

When the label included in the name of the log-in user is present (YES in step S14), the customization content of the corresponding label is acquired (step S15). When the label included in the name of the log-in user is not present (NO in step S14), the operational flow advances to step S9.

In step S9, the customization content of the "Default" label is overwritten with the customization contents acquired thus far in the order that they are acquired to determine the customization content (Step S9). The printer driver 10 applies the determined customization content (Step S11), reflects the determined customization content on the setting screen of the printer driver 10, and stores the customization information in the print job. Then, the printer driver 10 ends the customization processing (step S12).

Advantage of Third Exemplary Embodiment

According to the third exemplary embodiment, by describing the labels 44 and 45 which are composed of at least part of the names of the log-in users 41 and 42, it is possible to selectively apply the customization different for each log-in user to the plurality of printers 2 and 3 of the same model using the single printer driver 10.

Additionally, by describing the label composed of at least part of the information for identifying the information processing apparatus, it is possible to selectively apply the customization different for each of the PCs 6 to 8 to the plurality of printers 2 and 3 of the same model using the single printer driver 10.

In addition, since the arbitrary character string can be described in the label, it is possible to arbitrarily determine the information for identifying the printers 2 to 4, the information for identifying the user, and the information for identifying the information processing apparatus.

4. Fourth Exemplary Embodiment

A description will be given hereinbelow of a variation of the first exemplary embodiment. The description of the same components as those of the first exemplary embodiment will be omitted.

FIG. 8 is a view showing a customization information storage file according to a fourth exemplary embodiment. A customization information storage file 48 shown in FIG. 8 has a label 49 in addition to the labels in the case of the first exemplary embodiment.

The label 49 is a "third development department" label, and is composed of at least part of the information for identifying the printer 3. The information for identifying the printer 3 may be any information which can identify the printer 3 such as the production number, the machine number, the IP address, the MAC address, the place of installation, and the department of installation in addition to the name of the printer 3.

The information for identifying the label 49 is acquired from the name of the third printer icon 13. When the label 49 composed of at least part of the name of the third printer icon 13 is present, customization information 50 of the label 49 is applied. In the customization information 50, the labels 31 and 32 are described. In this case, the customization information 50 has the customization content obtained by combining the labels 31 and 32. Specifically, the customization information 50 has the content in which the customization information 34 of the "first development department" label 31 and the customization information 35 of the "second development department" 32 are combined.

In the case of FIG. 8, the printer for third development department staff 3 can perform the color printing, the simplex printing, and the output at 1 up, and the output at 1 up is set as the initial value in the printer for third development department staff 3. It is to be noted that, at this time as well, the customization information 33 of the "Default" label is overwritten with the customization information 50 (i.e., the pieces of customization information 34 and 35) of the "third development department" label 49.

Advantage of Fourth Exemplary Embodiment

According to the fourth exemplary embodiment, in the customization information, another label may be described, or other labels may also be described in combination. This can save time and effort to redundantly describe the pieces of customization information of the same content.

5. Other Exemplary Embodiments

In the first to fourth exemplary embodiments, the printer driver 10 has been described by way of example, but the present invention can be applied to device drivers such as a facsimile driver, a scanner driver, and the like.

INDUSTRIAL APPLICABILITY

The present invention can be used in the information processing apparatus, the information processing system, the computer readable medium recording the device driver, and the device driver.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a plurality of labels, each of the plurality of labels is associated with a name for identifying a device and a respective icon of a plurality of icons;
    a plurality of pieces of setting information which are associated with respective labels of the plurality of labels, and each piece of setting information of the plurality of pieces of setting information including a setting item corresponding to an operation of the device and setting content corresponding to the setting item;
    an identification section that, in response to a request received from the device when the operation is executed by the device, acquires information for identifying one of the plurality of labels, and identifies the one of the plurality of labels from the information; and
    an application section that applies setting information associated with the one of the plurality of labels identified by the identification section based on the name for identifying the device associated with the one of the plurality of labels to the operation executed by the device and transmits a device driver to apply the setting information associated with the one of the plurality of labels to the device, and
    wherein the operation of the device comprises using an icon from a plurality of icons to generate a job based on the setting information associated with the one of the plurality of labels and transmitting the job to be performed at a second device from the device to the second device via the information processing apparatus.

2. The information processing apparatus according to claim 1,
    wherein the plurality of labels and the plurality of pieces of setting information are described in a configuration file of the device driver.

3. The information processing apparatus according to claim 1, wherein one of the plurality of labels indicates an initial setting.

4. The information processing apparatus according to claim 3,
    wherein setting information associated with the one of plurality of labels indicating the initial setting is overwritten with setting information associated with another one of the plurality of labels.

5. The information processing apparatus according to claim 1,
    wherein a name of at least one of the plurality of labels indicates at least part of information for identifying a user.

6. The information processing apparatus according to claim 1,
    wherein a name of at least one of the plurality of labels indicates at least part of information for identifying the information processing apparatus.

7. The information processing apparatus according to claim 1,
    wherein an arbitrary character string is allowed to be applied to a name of at least one of the plurality of labels.

8. The information processing apparatus according to claim 2, further comprising:
    a setting section that sets an authority to produce or edit the configuration file of the device driver.

9. The information processing apparatus according to claim 1, further comprising:
    a setting section that sets an authority to produce or edit the information for identifying the one of the plurality of labels.

10. The information processing apparatus according to claim 1, further comprising:
    a setting section that sets an authority to access the information for identifying the device.

11. A non-transitory computer readable medium storing a program causing a computer to execute a process for setting a plurality of devices of an identical model, the process comprising:
    a plurality of labels, each of the plurality of labels is associated with a name for identifying a device and a respective icon of a plurality of icons;
    a plurality of pieces of setting information which are associated with respective labels of the plurality of labels, and each piece of setting information of the plurality of pieces of setting information including a setting item corresponding to an operation of one of the plurality of devices and setting content corresponding to the setting item; and
    an application section, in response to a request received from the one of the plurality of devices, that applies the setting item corresponding to the operation of the one of the plurality of devices and the setting content corresponding to the setting item to the operation of the one of the plurality of devices based on the name for identifying the one of the plurality of devices associated with a respective label of the plurality of labels and transmits a device driver to apply the setting item and the setting content to the one of the plurality of devices,
    wherein the operation of the one of the plurality of devices comprises using an icon from a plurality of icons to generate a job based on the setting information associated with one of the plurality of labels and transmitting the job to be performed at a second device from the device to the second device via an information processing apparatus.

12. A non-transitory computer readable medium storing a program of a device driver causing a computer to execute a process for setting a plurality of devices of an identical model, the process comprising:
    reading a plurality of labels, each of the plurality of labels is associated with a name for identifying a device and a respective icon of a plurality of icons, and a plurality of pieces of setting information which are associated with the respective labels of the plurality of labels, and each piece of setting information of the plurality of pieces of setting information indicating a setting item corresponding to an operation of one of the plurality of devices and setting content corresponding to the setting item;

acquiring information for identifying one of the plurality of labels in response to a request received from the one of the plurality of devices when the operation is executed by the one of the plurality of devices; and identifying the one of plurality of labels from the acquired information and applying setting information associated with the one of the plurality of labels based on the name for identifying the one of the plurality of devices associated with the one of the plurality of labels to the operation executed by the one of the plurality of devices and transmitting a device driver to apply the setting information associated with the one of the plurality of labels to the one of the plurality of devices, wherein the operation of the one of the plurality of devices comprises using an icon from a plurality of icons to generate a job based on the setting information associated with the one of the plurality of labels and transmitting the job to be performed at a second device from the device to the second device via an information processing apparatus.

13. An information processing apparatus comprising:

a plurality of labels, each of the plurality of labels is associated with a name for identifying a device and a respective icon of a plurality of icons;

a plurality of pieces of setting information which are associated with respective labels of the plurality of labels, and each piece of setting information of the plurality of pieces of setting information including a setting item corresponding to an operation of a device and setting content corresponding to the setting item;

an identification section that, in response to a request received from the device when the operation is executed by the device, acquires information for identifying one of the plurality of labels, and identifies the one of the plurality of labels from the information; and an application section that applies setting information associated with the one of the plurality of labels identified by the identification section based on the name for identifying the device associated with the one of the plurality of labels to the operation executed by the device and transmits a device driver to apply the setting information associated with the one of the plurality of labels to the device, wherein one of the plurality of labels indicates an initial setting, wherein setting information associated with the one of plurality of labels indicating the initial setting is overwritten with setting information associated with another one of the plurality of labels, and wherein the operation executed by the device comprises using an icon from a plurality of icons to generate a job based on the setting information associated with the one of the plurality of labels and transmitting the job to be performed at a second device from the device to the second device via the information processing apparatus.

14. An information processing apparatus comprising:

a plurality of labels, each of the plurality of labels is associated with a name for identifying a device and a respective icon of a plurality of icons;

a plurality of pieces of setting information which are associated with respective labels of the plurality of labels described in a configuration file, and each piece of setting information of the plurality of pieces of setting information including a setting item corresponding to an operation of the device and setting content corresponding to the setting item;

an identification section that, in response to a request received from the device when the operation is executed by the device, acquires information for identifying one of the plurality of labels, and identifies the one of the plurality of labels from the information; and an application section that applies setting information associated with the one of the plurality of labels described in the configuration file and identified by the identification section based on the name for identifying the device associated with the one of the plurality of labels to the operation executed by the device and transmits a device driver to apply the setting information associated with the one of the plurality of labels to the device, wherein the operation of the device comprises using an icon from the plurality of icons for generating a job, using the device driver to apply the setting information associated with the one of the plurality of labels to the device, and transmitting the job to be performed at a second device from the device to the second device via the information processing apparatus.

* * * * *